Jan. 7, 1941.        H. G. WITMER         2,227,615
            RAILWAY TRACK CIRCUIT APPARATUS
                  Filed Nov. 28, 1939
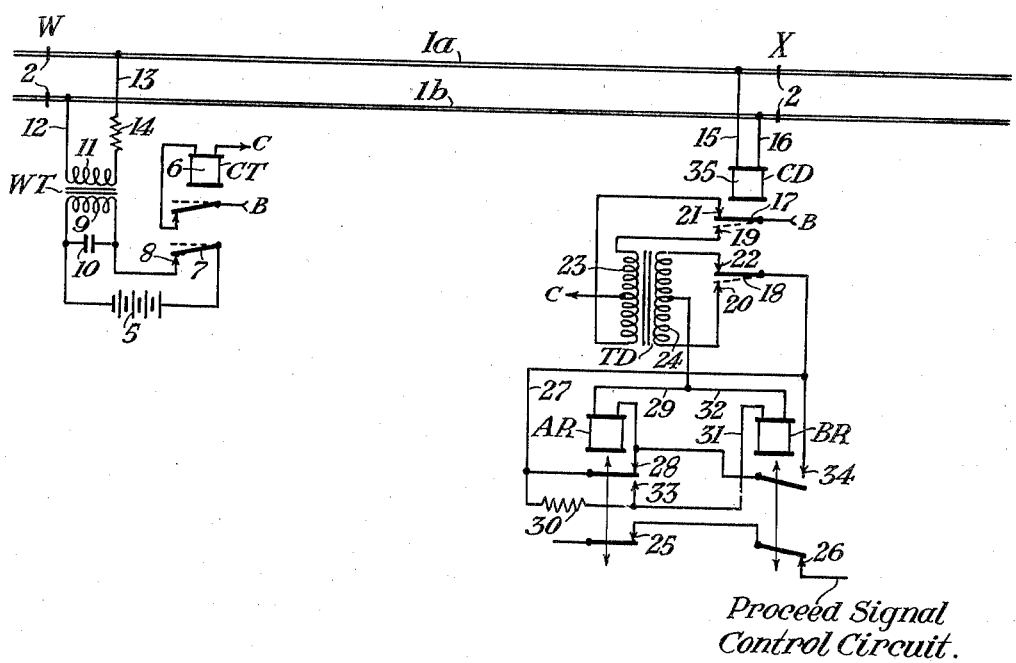
Proceed Signal
Control Circuit.
INVENTOR
Harold G. Witmer.
BY
HIS   ATTORNEY Patented Jan. 7, 1941

2,227,615

UNITED STATES PATENT OFFICE 2,227,615

RAILWAY TRACK CIRCUIT APPARATUS

Harold G. Witmer, Edgewood, Pa., assignor to The Union Switch & Signal Company, Swissvale, Pa., a corporation of Pennsylvania Application November 28, 1939, Serial No. 306,541

2 Claims. (Cl. 246—34)

My invention relates to railway track circuit apparatus, and particularly to apparatus for track circuits using coded current.

Railway track circuits have been proposed which use time spaced impulses of direct current with the individual impulses of relatively high peak voltage and of short duration as compared with the duration between successive impulses. The high peak voltage serves as an aid to the shunting sensitivity of the track circuit and the short duration serves to limit the output of the current source to a relatively low energy level. In such track circuits code following track relays are provided for controlling the signaling circuits. It has been found that when adverse train shunting conditions prevail due to rusty rail surfaces, light-weight high speed trains and other operating conditions, a few impulses of current of sufficient magnitude to operate the code following track relay may reach the relay now and then past the poor train shunt with the result that a proceed signal indication may be falsely established for an interval.

Accordingly, a feature of my invention is the provision of novel and improved apparatus for track circuits of the type here contemplated wherewith the display of a proceed signal indication is not effected until the code following track relay has responded to several successive impulses of the track circuit current.

To accomplish this feature as well as other features and advantages of my invention, I provide two slow pick-up relays, the second one of which is also slow releasing, and a decoding transformer. These relays control the circuits of each other so that the second relay is energized over a back contact of the first relay, the first relay is energized over a front contact of the second relay and then held energized over a stick circuit. The signal circuit includes in series a front contact of the first relay and a back contact of the second relay. Electromotive force is induced in the decoding transformer due to operation of the code following track relay and such electromotive force is rectified and used to energize the slow pick-up relays. Hence, the track circuit current impulses must operate the code following track relay for a period sufficient to pick up the second and first relays in cascade and to permit the second relay to release before the signal circuit is closed.

I shall describe one form of apparatus embodying my invention, and shall then point out the novel features thereof in claims.

Referring to the drawing which is a diagrammatic view showing a preferred form of apparatus embodying my invention, the reference characters 1a and 1b designate the track rails of a stretch of railway track which rails are formed by the usual insulated rail joints 2 into a track section W—X, which track section may be one of a series of track sections of a signal system. The track section W—X is provided with a track circuit comprising a source of coded direct current connected across the rails at one end of the section and a code following track relay connected with the rails at the other end of the section.

The source of coded direct current for the track circuit of section W—X comprises a battery 5, a code transmitter CT and a track transformer WT. The secondary winding 11 of transformer WT is connected across the rails 1a and 1b over wires 12 and 13, a current limiting resistor 14 being preferably interposed in wire 13. The primary winding 9 of transformer WT is connected across battery 5 over a code contact member 7 of the code transmitter CT, a condenser 10 being preferably connected across the primary winding 9 to improve the operation. The code transmitter CT may take the form of any one of the several well-known structures for such devices and it is sufficient to point out that as long as the operating winding 6 of code transmitter CT is supplied with current from any convenient source whose terminals are indicated at B and C, the contact member 7 is operated at a preselected code rate, such as, for example, 75 operation cycles per minute.

The contact member 7 of code transmitter CT is biased to normally engage a contact 8 and is lifted to disengage the contact 8 during each operation cycle. When contact member 7 engages contact 8, current is supplied from battery 5 to the primary winding 9 of transformer WT and magnetic energy is stored in the transformer. The circuit is arranged as to its time constant so that the energy builds up in transformer WT relatively slow and little if any electromotive force is induced in the secondary winding 11, at least the electromotive force induced in secondary winding 11 when energy is stored in transformer WT is of so small a magnitude that it can be neglected. When contact member 7 disengages contact 8 the flow of current to the primary winding 9 is interrupted and the magnetic energy stored in transformer WT dies away rapidly and an electromotive force of relatively high peak voltage is induced in the secondary winding 11 and an impulse of direct current is supplied to the track circuit. It is to be seen, therefore, that impulses of direct current are supplied to the track circuit at a rate corresponding to the rate at which the code transmitter CT is operated.

The track circuit of section W—X is provided with a code following track relay CD whose operating winding 35 is connected across rails 1a and 1b of section W—X over wires 15 and 16. Relay CD may be either of the neutral or polar type and as here shown it is a neutral relay having two operated contact members 17 and 18 which are biased to engage back contacts 19 and 20, respectively, when the relay is deenergized and are raised to engage front contacts 21 and 22, respectively, when the relay is effectively energized. Each impulse of current supplied to the rails of the section through the track transformer WT in the manner explained hereinbefore is effective to energize and pick up the code following relay CD with the result that relay CD operates the contact members 17 and 18 at a rate corresponding to the code rate of the current impulses.

When code following relay CD is operated causing its contact member 17 to alternately engage back contact 19 and front contact 21, direct current is alternately supplied to the two portions of primary winding 23 of a decoding transformer TD from a source of direct current whose terminals are indicated at B and C, with the result that an electromotive force of a frequency corresponding to the rate at which the relay CD is operating is induced in the secondary winding 24 of transformer TD. Such electromotive force induced in the secondary winding 24 is rectified by the operation of contact member 18 of relay CD and unidirectional current is supplied to two control relays AR and BR as will shortly be explained.

The first control relay AR is provided with slow pick-up characteristics, its slow pick-up period being preferably of the order of 2 seconds. Relay AR is also preferably made slightly slow to release although it may have the usual release characteristics for such relays. The second control relay BR is a slow release slow pick-up relay, its slow release period and slow pick-up period being preferably of equal duration, say, for example, each of the order of 2 seconds.

Normally, that is, when track section W—X is unoccupied and code following relay CD is operated in response to the code impulses of current supplied to the track circuit through track transformer WT, the first control relay AR is picked up and the second control relay BR is released as shown in the drawing, with the result a proceed signal control circuit including front contact 25 of relay AR in series with back contact 26 of relay BR is closed. Each time code following relay CD is picked up and an electromotive force induced in the secondary winding 24 of transformer TD, such electromotive force causes current to flow in a circuit which can be traced from the top terminal of secondary winding 24 over contact 18—22 of relay CD, wire 27, front contact 28 of relay AR when that relay is picked up in a manner to shortly appear, winding of relay AR and wire 29 to the mid terminal of secondary winding 24. Each time code following relay CD is released and an electromotive force induced in the secondary winding 24 such electromotive force causes an impulse of current to flow in a circuit which can be traced from the lower terminal of secondary winding 24 over contact 18—20 of relay CD, wire 27, front contact 28 and winding of relay AR and wire 29 to the mid terminal of secondary winding 24. The parts are so connected that current always flows in the same direction in relay AR and hence relay AR is retained picked up as long as the code following relay CD is operated, relay AR being preferably slightly slow to release so that there is no tendency for relay AR to release between the successive electromotive forces. As stated hereinbefore relay AR may have the usual release characteristics because of the close spacing of the successive electromotive forces applied to that relay from the secondary winding 24. It is to be noted that when code following relay CD is picked up closing front contact 18—22 a circuit can be traced from the top terminal of secondary winding 24 over contact 18—22 of relay CD, wire 27, a resistor 30, wire 31, winding of relay BR and wires 32 and 29 to the mid terminal of secondary winding 24, and when code following relay CD is released closing back contact 18—20 a similar circuit can be traced for the relay BR from the lower terminal of secondary winding 24. Resistor 30 is of such value, however, that the current supplied to relay BR therethrough is not sufficient to energize relay BR at its pick-up value or even at a value sufficient to retain relay BR picked up. The current supplied through resistor 30 to relay BR is, however, sufficient to cause a delay in the release of the relay, that is, the current supplied to relay BR through resistor 30 aids in prolonging the release period of relay BR.

When a train enters the track section W—X to shunt the track circuit the code following relay CD is inactive with its contact members 17 and 18 engaging their respective back contacts, and hence no electromotive force is induced in secondary winding 24 of the decoding transformer TD and no energy is supplied to either relay AR or BR with the result that both relays are released and the signal control circuit is opened at front contact 25 of relay AR.

When the train vacates the section W—X and track relay CD is again operated, energy is supplied from secondary winding 24 first to the relay BR over a circuit the same as traced hereinbefore except the circuit now includes back contact 33 of relay AR in shunt with resistor 30, and because resistor 30 is shunted, the current supplied to relay BR is sufficient to effectively energize that relay and the relay is picked up at the end of its slow pick-up period. When relay BR picks up closing front contact 34, the energy induced in secondary winding 24 is applied to relay AR in multiple with the relay BR and the relay AR is energized and picked up at the end of its slow pick-up period. That is to say, after relay BR is picked up closing front contact 34 and during the slow pick-up period of relay AR when back contact 33 is closed, both relays AR and BR are energized in multiple by the electromotive forces induced in the secondary winding 24.

When relay AR is picked up opening back contact 33 to remove the shunt around resistor 30, the current supplied to relay BR is materially reduced and relay BR is released at the end of its slow release period, the release of relay BR being prolonged due to the small amount of energy supplied to that relay through resistor 30. After relay BR is released to open front contact 34, the relay AR is supplied with current over its front contact 28 as explained hereinbefore. When relay BR is released closing back contact 26, the signal control circuit is completed. It is to be observed that the shunt path including resistor 30 around back contact 33 of relay AR may not be needed and can be omitted if desired.

I have found that when code impulses of direct current of the code rate of 75 impulses per minute are used and the shunt path including resistor 30 is omitted, a delay in the reestablishing of the signal control circuit of 8 to 9 impulses of the track circuit current can readily be effected. Furthermore, this delay time in reestablishing the signal control circuit is fairly constant over the range of voltages normally effected due to track ballast variations, and also fairly constant over the usual range of voltages of the source used to energize the decoding transformer. If the shunt path including resistor 30 is included the delay time in reestablishing the signal control circuit can be correspondingly increased. It is to be observed that if resistor 30 is provided and the resistor is accidentally disconnected, the delay time of 8 to 9 current impulses is still effective.

It follows that with apparatus embodying my invention a poor train shunt which may permit a few current impulses to reach the code following track relay CD of sufficient magnitude to operate the relay the proceed signal circuit is not reestablished unless some 8 or 9 successive impulses operate the code following relay. That is, to reestablish the proceed signal control circuit, the code following track relay must be operated by successive current impulses for a period greater than the sum of the slow pick-up period of relay BR, the slow pick-up period of relay AR and the slow release period of relay BR.

Although I have herein shown and described only one form of railway track circuit apparatus embodying my invention, it is understood that various changes and modifications may be made therein within the scope of the appended claims without departing from the spirit and scope of my invention.

Having thus described my invention, what I claim is:

1. Track circuit apparatus for use with a track circuit supplied with time spaced impulses of current for operating a code following track relay comprising, a first relay provided with a slow pick-up period, a second relay provided with a slow pick-up and a slow release period, a source of electromotive force, a resistor, circuit means including a contact member of said code following track relay and a back contact of said first relay in shunt with said resistor to connect said source of electromotive force with a winding of said second relay to effectively energize the second relay when said back contact is closed to pick up the second relay, said resistor proportioned so that said second relay is energized insufficiently to retain the relay picked up when the said back contact is open but is energized sufficiently to delay its release, other circuit means including a contact member of said code following track relay and either a front contact of said second relay or a front contact of said first relay to connect said source of electromotive force with a winding of said first relay to energize the first relay, and a signal control circuit including a front contact of said first relay in series with a back contact of said first relay.

2. In track circuit apparatus for use with a track relay which is effectively energized when the track circuit is unoccupied and which relay is shunted by a train occupying such track circuit, the combination comprising, a first and a second relay, a first circuit including a front contact of said track relay and a back contact of said first relay to energize and pick up said second relay, a resistor connected in shunt with said back contact, a second circuit including a front contact of said track relay and a front contact of said second relay to energize and pick up said first relay, a stick circuit including a front contact of said track relay and a front contact of said first relay to retain the first relay picked up, said resistor proportioned to permit said second relay to be energized by said first circuit sufficiently only to cause a predetermined delay in the release of said second relay when said first relay is picked up, and a signal control circuit including in series a back contact of said second relay and a front contact of said first relay.

HAROLD G. WITMER.